US006882268B2

(12) United States Patent
Roz et al.

(10) Patent No.: US 6,882,268 B2
(45) Date of Patent: Apr. 19, 2005

(54) METHOD FOR KEYLESS UNLOCKING OF AN ACCESS DOOR TO A CLOSED SPACE

(75) Inventors: Thierry Roz, Les Hauts-Geneveys (CH); Marc Degrauwe, Chez-le-Bart (CH)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 10/482,647

(22) PCT Filed: Jun. 20, 2002

(86) PCT No.: PCT/EP02/06815

§ 371 (c)(1),
(2), (4) Date: Jan. 5, 2004

(87) PCT Pub. No.: WO03/005309

PCT Pub. Date: Jan. 16, 2003

(65) Prior Publication Data

US 2004/0178882 A1 Sep. 16, 2004

(30) Foreign Application Priority Data

Jul. 5, 2001 (EP) ............................................ 01202579

(51) Int. Cl.[7] ................................................ B60R 25/00

(52) U.S. Cl. ...................................... 340/5.72; 340/5.61

(58) Field of Search ............................... 340/5.72, 5.61, 340/825.72, 825.69, 5.2, 5.66, 5.64, 5.7, 426.1, 5.6, 5.5, 10.3, 10.33, 10.1; 307/10.2, 10.1; 70/278

(56) References Cited

U.S. PATENT DOCUMENTS 4,688,036 A 8/1987 Hirano et al.
5,252,965 A * 10/1993 Gidwani et al. ........... 340/5.23
6,439,683 B1 * 8/2002 Wolf et al. ................ 340/5.61
6,538,560 B1 * 3/2003 Stobbe et al. ............. 340/5.72
6,552,649 B1 * 4/2003 Okada et al. ............. 340/5.61
6,714,119 B1 * 3/2004 Mindl et al. .............. 340/5.72

FOREIGN PATENT DOCUMENTS

DE 198 27 586 A1 12/1999
DE 192 02 797 C1 6/2000
DE 199 39 063 A1 2/2001
EP 0 690 190 A1 1/1996
FR 2 737 992 A1 2/1997

OTHER PUBLICATIONS

Copy of International Search Report for the International Application in French, mailed Nov. 27, 2002, authorized by H. Teutloff.

* cited by examiner

*Primary Examiner*—Anh V. La
(74) *Attorney, Agent, or Firm*—Griffin & Szipl, P.C.

(57) ABSTRACT

The invention relates to a method for keyless unlocking of an access door to a closed space, in particular a motor vehicle, which is carried out by an electronic system, comprising a control module for an electronic lock, associated with the door and a portable transponder for authorised users. The method comprises sending an interrogation signal at low frequency from the control module to the transponders and also the exchange of data at high frequency. The control module has reception device for the above which are at least continuously in a listening mode. The method is characterised in that the low frequency transmitters are inactive in a preliminary functional mode, the high frequency transmission device in the transponder periodically emits an activation signal for said the transmission device in order that the above are only activated during limited periods, which ensures the reception of an interrogation signal for a transponder entering the low frequency communication region.

10 Claims, 2 Drawing Sheets

METHOD FOR KEYLESS UNLOCKING OF AN ACCESS DOOR TO A CLOSED SPACE

This is a National Phase Application in the United States of International Patent Application No. PCT/EP 02/06815 filed Jun. 20, 2002, which claims priority on EP Patent Application No. 01202579.7, filed Jul. 5, 2001. The entire disclosures of the above patent applications are hereby incorporated by reference.

FIELD OF THE INVENTION

The present invention concerns a "keyless" method for unlocking an access door to a closed space, in particular a car. Those skilled in the art know several implementations and variants of such methods for opening a car door, i.e. unlocking its electronic lock, or for starting the car, wherein the conventional contact keys or mechanical keys are replaced by transponders or electronic RFID units. Thus, activation of the electronic lock is controlled via wireless communication between a control device associated with the door and at least one transponder intended for this application and arranged for communicating, in particular, an identification code.

BACKGROUND OF THE INVENTION

There is known from U.S. Pat. No. 4,688,036, a "keyless" access system for a motor vehicle, wherein the electronic lock control device, in particular the electromagnetic signal emission and reception circuits, is activated only after the user has activated a manual switch. The user in possession of an authorised transponder, thus actuates a switch arranged outside the car to activate first of all the transmitter of the control device such that the latter can send an interrogation signal to the transponder after having woken it. Thus, activation of the system's emission and reception circuits and the communication protocol for determining whether the transponder is authorised occur between actuation of the external switch and the sending of an unlocking signal to the electronic lock.

By providing an external manual switch in the method for opening a door using a transponder, the power consumption of the door locking control device is limited, this control device being activated only for a given period of time following actuation of the external switch.

It will be noted in fact, that continuous activation of the control device, particularly periodically sending an interrogation signal to detect the presence of an authorised transponder, generates high energy consumption, particularly because of certain materials that form the car. Although the energy source in a car can be large, particularly taking energy from a battery of the latter, continuous activation of the electromagnetic signal transmission means can cause the battery in question to run down when the car is not used regularly.

U.S. Pat. No. 4,688,036 provides for the use of only one communication frequency and for the external switch to be arranged under the handle of the door concerned.

DE Patent No. 198 27 586 discloses a more improved access system to a car, wherein low frequency (LF) and high frequency (HF) communication is provided, so as to increase the transmission speed of encoded data between the electronic door unlocking device and an authorised transponder, the validly detected presence of which causes said door to open. The speed of such communication is particularly important within the scope of the main proposed embodiment where the transmission circuit for an interrogation signal is activated by actuating the handle used for opening the door. It is thus preferable, in such an embodiment, for the electronic lock to be opened quickly; otherwise the user will find the door locked first of all when he pulls the handle to open the door.

It will be noted that the low frequency transmitter is essentially used for sending the interrogation signals to the transponders in a limited area, close to the door.

As shown in FIG. 1 annexed hereto, the reception area for an LF interrogation signal by a transponder defines approximately a semi-circle 2 with a radius of 1.5 to 2 m around antenna 6 arranged in a door of car 8. However, the high frequency communication circle 4 between transponder 10 and the HF receiver arranged in the car typically has a radius of at least 30 m.

DE Patent No. 198 27 586 also provides for a remote actuation button for the electronic lock to be arranged in the transponder. Thus, when the user wishes to open a door or the doors of his car from a distance, he only need depress the button-switch of the transponder for the latter to send an HF signal to the HF reception means of the lock control device. This improved embodiment requires the HF reception means of the control device to be permanently or almost permanently in listening mode. Although this function requires a certain amount of energy, the energy consumption generated is however relatively low for the conventional energy sources that can be arranged in cars.

DE Patent No. 198 27 586 also proposes a particular embodiment wherein no external switch is provided for activating the lock control device communication means, the low frequency transmission means continuously sending, in a cyclical manner, an interrogation signal. Given that the communication radius is typically from 1.5 to 2 m for the LF transmitter, the door opening authorisation protocol can be started as soon as a transponder enters the LF communication area. When a user provided with a transponder actuates an external switch of the vehicle, the transponder is located between 0.5 and 1 m from the LF transmitter. In the case of this particular embodiment, starting from the hypothesis that the user walks at a speed of 1 m per second, the door opening authorisation protocol can start approximately one second before the moment when the user reaches the door handle. Thus, the communication time available is greatly increased such that it is possible to implement a highly secure identification protocol and to unlock the electronic lock before the user pulls the handle to open the door. This feature increases the ease of use of the "keyless" opening system. However, currently, this embodiment is not used in practice since it generates high energy consumption, as was explained hereinbefore. Given this major problem, automobile manufacturers generally provide for the doors of a car to be opened either by actuating the handle, or by pressing on a button-switch arranged on the surface of the transponder.

It is an object of the present invention to overcome the aforementioned problem while maintaining optimum use of the low frequency communication area of the control device.

SUMMARY OF THE INVENTION

The invention therefore concerns a method for unlocking an access door to a closed space whose features are given in claim 1 annexed hereto.

Owing to the features of the method according to the invention, it is possible to activate the low frequency transmission means of an electronic lock control device before the transponder penetrates the communication area of said transmission means, without having to manually actuate a transponder switch. Indeed, the periodic sending of an activation signal for the LF transmission means of the control device allows the hands to be kept free during the preliminary operating mode of the electronic system. This preliminary mode can be continually switched one while the transponder is being powered.

The periodic sending of an activation signal for the LF transmission means does not generate any extra power consumption for the vehicle when said control device can be activated remotely using a high frequency signal sent by the transponder. Indeed, in such a currently conventional case, the HF reception means of the control device are continually activated. Moreover, the transponders are already fitted with HF transmission means. As regards the power consumption of a transponder, mean power consumption for powering the LF receiving system in listening mode consumes approximately 2 to 5 $\mu$A. If the activation signal for the LF transmission means is sent with a repetition period of approximately 30 seconds, the mean extra power consumption for the transponder can be estimated at approximately 3 $\mu$A. This extra power consumption is certainly significant, but remains sufficiently low to allow the functionality peculiar to the present invention to be integrated in a door opening system answering the required criterion of autonomy; even when the preliminary operating mode of the electronic system remains permanently activated at least outside the periods of activation of the electronic lock control device low frequency transmission means.

BRIEF DESCRIPTION OF THE DRAWINGS

The present invention will be described more precisely hereinafter using the following description, made with reference to the annexed drawings, given by way of non-limiting examples, in which.

DETAILED DESCRIPTION OF THE ILLUSTRATIVE EMBODIMENTS

Figure 2:
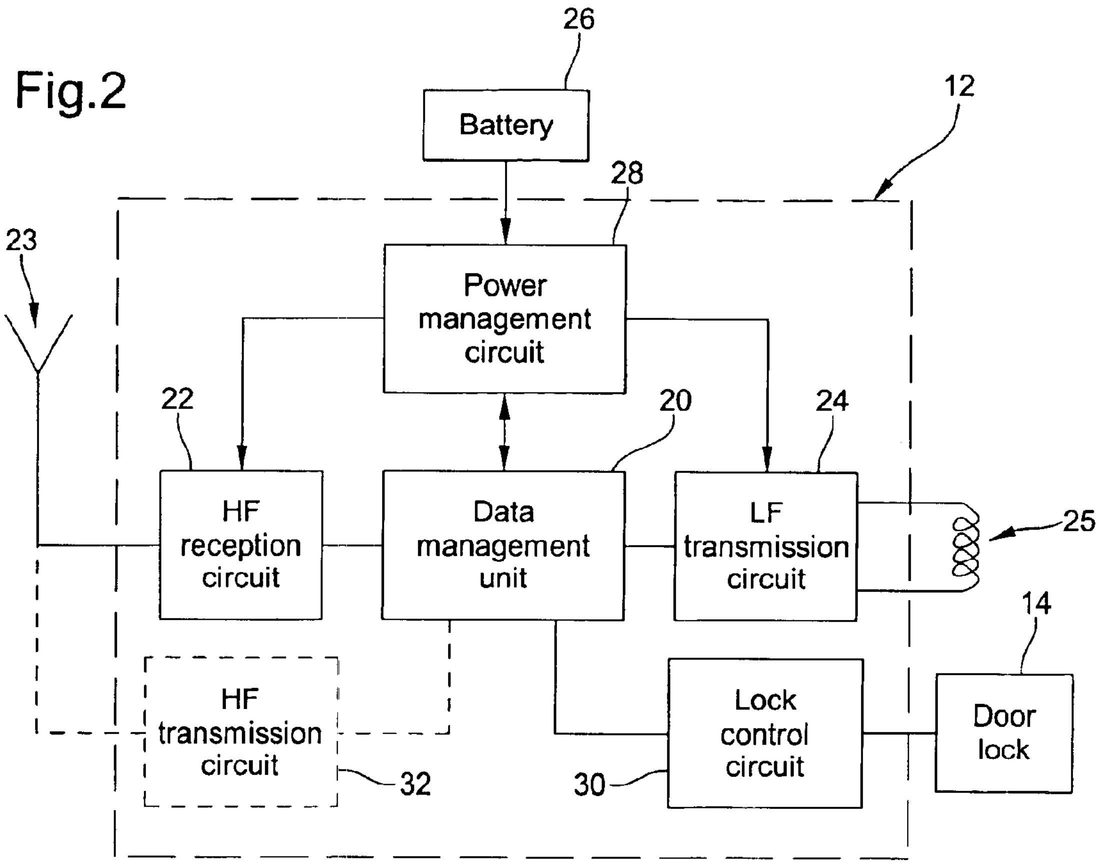
FIGS. 2 and 3 show respectively a control device for an electronic lock and a transponder associated therewith, which are used for implementing the present invention.
Figure 3:
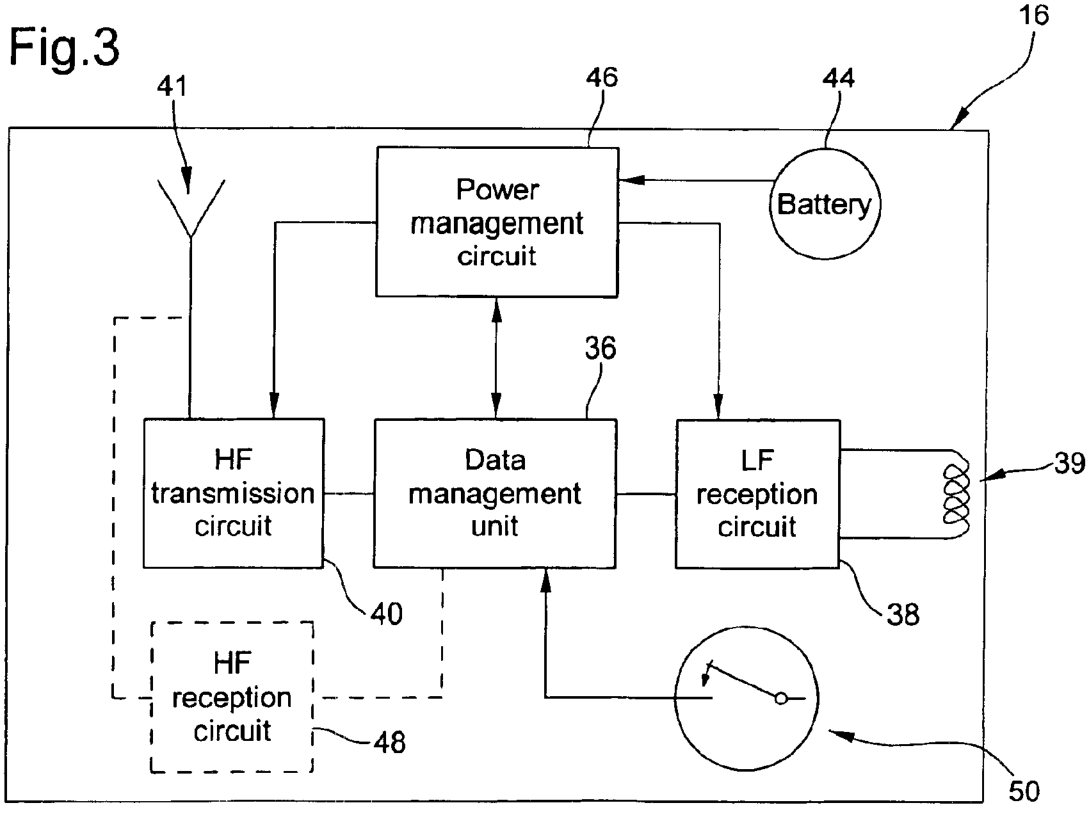

Referring to FIGS. 2 and 3 an embodiment of an electronic system for implementing the method of the invention will be briefly described.

This electronic system comprises on the one hand a control device 12 for at least one electronic lock 14 of an access door to a closed space, in particular a motor vehicle and on the other hand at least one transponder 16 intended to be worn by a person authorized to access said closed space, in particular to enter into said vehicle.

Device 12 comprises in particular a data management central unit 20 associated with a high frequency (HF) reception circuit 22 connected to an antenna 23 and to a low frequency (LF) transmission circuit 24 connected to an antenna 25. Circuits 20, 22, and 24 are powered by a battery 26 via a power management circuit 28. Central unit 20 is connected to a control circuit 30 for at least one electronic lock, said circuit being in turn electrically connected to the electronic lock(s) of the access door(s) to the closed space.

In an alternative embodiment for a particular implementation mode, a high frequency transmission circuit connected to antenna 23 or a similar antenna is provided.

Transponder 16 also comprises a data management central unit 36 associated with an LF reception circuit 38 connected to an antenna 39 and to an HF transmission circuit 40 connected to an antenna 41. Circuits 36, 38, and 40 are powered by a battery 44 via a power management circuit 46. In a particular embodiment, transponder 16 further comprises an HF reception circuit 48. The transponder transmission and reception units are arranged so as to be able to communicate with the corresponding units of device 12. In a particular embodiment, a switch 50, which may be actuated by a button arranged at the surface of the transponder, is provided. This switch enables to actuate from a distance an electronic device of a motor vehicle associated with device 12, in particular an electronic lock.

The method of the invention, provides that at least a portion of the communication protocol between the transponder and the control device for the electronic lock uses at least a low frequency signal, i.e. requires a communication at low frequency and thus at a short distance between transponder 16 and device 12. In particular, it is provided that device 12 sends an LF interrogation signal to the transponder and receives in response an identification signal. This identification signal may comprise various messages and should be understood in a broad sense. The protocol for identification and triggering the unlocking of electronic lock can provide a combination of data transmitted at low frequency and also at high frequency. In the embodiment shown in FIGS. 2 and 3, only device 12 sends LF signals.

It will be noted in this context that HF is to be understood as electromagnetic signals having a high frequency, i.e. a frequency comprised in the HF band or in a higher frequency band, in particular in the UHF band.

According to the invention, in a preliminary operating mode, LF transmission means 24, 25 are inactive and HF transmission means 40, 41 of the transponder(s) 10 of the system transmit periodically an HF signal for activating the LF transmission means of device 12. By "inactive" or deactivated" it should be understood that the transmission means are in a low consumption mode wherein no signal transmission occurs. With regard to the reception means, it should be understood that they are in a rest mode and not in a listening mode.

Starting from the assumption that the HF communication distance of the system is approximately 30 m, in a first variant one can provide a repetition period of the activation signal slightly greater than 5 seconds. Thus, a person running towards the motor vehicle at the speed of approximately 5 m/s will send at least an activation signal to be received by device 12 before that person reaches the handle of the door to open. In another variant, in order to save the electrical energy used by the transponders, the repetition period is provided to be between 10 seconds and one minute, in particular 30 seconds. This latter value guarantees the activation of the LF transmission means for a person walking towards the motor vehicle at the speed of approximately 1 m/s.

According to a preferred mode of implementation, the LF transmission means of device 12 are deactivated after a determined activation period if no valid identification signal has been received by the device. In this case said preliminary mode is then again selected.

Owing to the characteristics of the invention, it is possible to obtain a method for keyless unlocking an access door to a motor vehicle which is efficient without at the same time consuming too much energy and discharging battery 26. Preferably, an LF interrogation signal is sent with a high repetition rate as soon as the LF transmission means of device 12 have been activated. Thus, as soon as a transponder enters the LF communication region associated to transmission means 24, 25 the authorisation and identification protocol for the actuation of the electronic lock are activated. Typically the time available between the reception of the interrogation signal by the transponder and the actuation of the handle for opening the door in question is here of at least one second. Consequently, the time available for the electronic lock unlocking protocol is at least three times longer in the case where the LF transmission means are activated by the beginning of the actuation of the door handle.

Consequently, one distinguishes, in the case of the method described herein, a preliminary operating mode and a detection mode, the detection mode being provided as soon as the LF transmission means are activated for sending periodically an interrogation signal until at least the reception of an identification signal or in absence of such a reception, until the end of said determined activation period.

According to a particular variant of the method of the invention, it is provided that when an interrogation signal is received by the LF transmission means of transponder 16, this transponder stops sending said activation signal as long as it receives low frequency signals from device 12 at least periodically.

Figure 1:
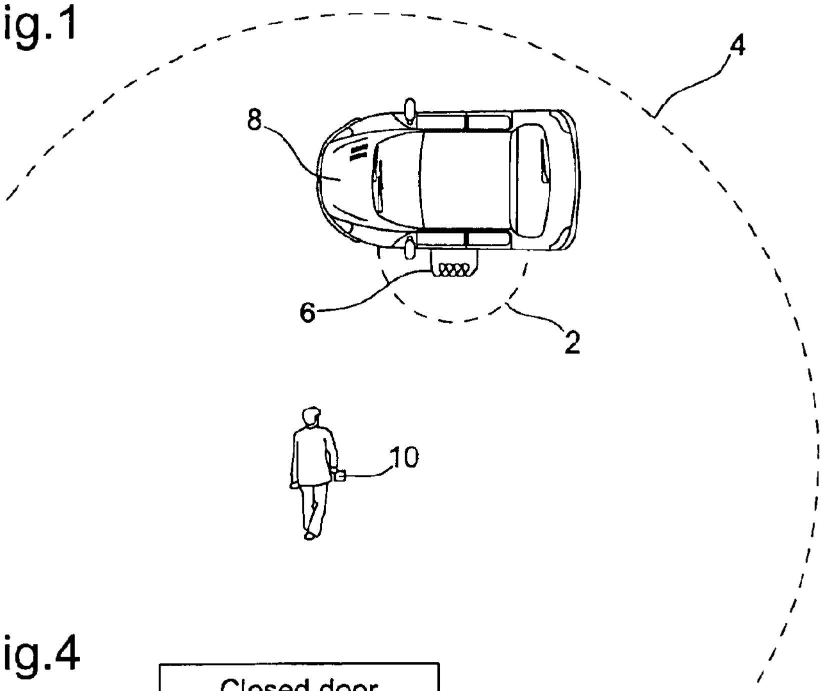
FIG. 1, already described, schematically shows a system for unlocking the door of a motor vehicle wherein the communication is made at low frequency as well as at high frequency.
Figure 4:
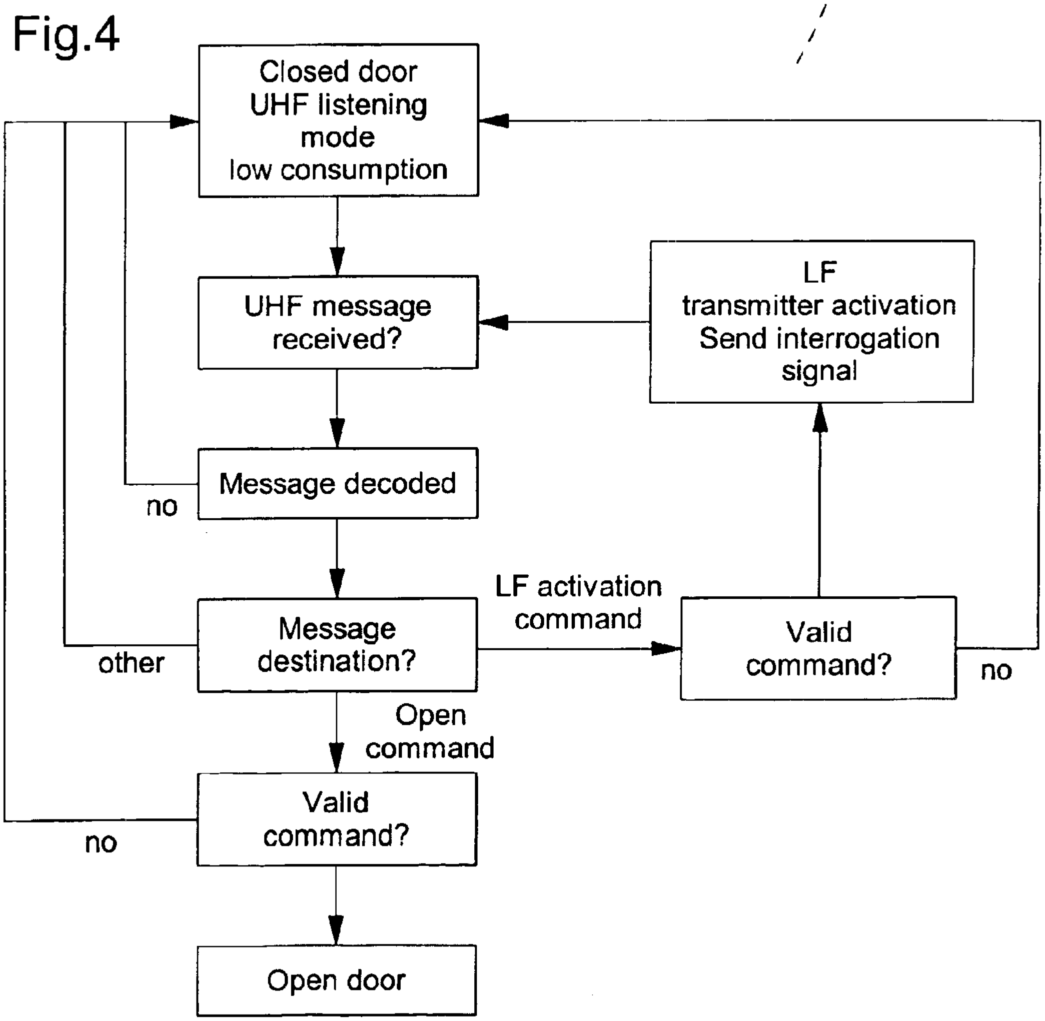
FIG. 4 is a diagram schematically representing various steps of one implementation of the method of the invention.

FIG. 4 shows a diagram of one implementation mode of the method of the invention. When the door(s) of a motor vehicle are locked and no authorised transponder is communicating or in any other way interacting with control device 12, the system and in particular device 12 is set in a low consumption operating mode. However, HF reception mode of device 12 are in a listening mode. As long as no UHF message is received, the system remains in this operating mode. However, if an UHF message is received, this message is decoded and the destination of the message is determined. It may be, in the context of the method in question, either a command for remotely unlocking the door by means of manual switch 50 (FIG. 3) or an activation command for the LF transmitter of device 12, or a message foreign to the method in question. In the latter case, the system remains or returns in the low consumption mode. In the two other cases the validity of the command is tested and if the command is valid the corresponding action is effected, i.e. either the electronic lock is unlocked also simply designated “door opening”, or the LF transmitter is activated which causes an interrogation signal to sent periodically.

Of course, the one skilled in the art can envisage here various implementation variants. In a first variant, the HF signals transmitted by the transponders can comprise a heading for the commands in order to indicate whether it is an identification signal or an activation signal. In this case, only the message heading must be read or decoded in a first step and the following portion of the message will only be read or decoded if the heading corresponds to a command known to the system. In another variant wherein the received UHF messages are directly decoded, in a preferred manner it is provided to firstly test whether it is a valid command for activating said LF transmitter, since an opening command via the actuation of a switch 50 is generally effected at a certain distance from the motor vehicle. Said activation signal may contain an identification sequence which limits the transponder capable of activating the LF transmitter of the vehicle. Preferably, it is provided that only the transponders which are authorized for a given vehicle and identified as such can activate this LF transmitter.

In another variant, one can provide that when LF transmitter is activated the system ignores other activation command signals and only checks if it is an authorised opening command signal.

It will be noted that it is possible to provide in the context of the method of the invention that the activation of the LF transmission means of device 12 can also be achieved by the actuation of the door handle in question or another external switch provided for that purpose. This enables the robustness of the system to be increased and in particular to remedy a situation wherein the transponder has not supplied any valid activation command signal or this signal has not been received for any reason.

According to a particular implementation mode, when activation signal is received by device 12, the latter sends an acknowledgement signal to the transponder via transmission circuit 32 (FIG. 2) to transponder 16 in which an HF reception circuit 48 is arranged. This acknowledgement signal is used to indicate to the transponder having supplied the activation signal that it has been detected. According to preferred variant, after reception of the acknowledgement signal, said transponder activates the LF reception means in a listening mode in order to receive a interrogation signal. Conversely, LF receiver 38 is deactivated at least most of the time when the system operates in said preliminary mode. This last characteristic is particularly advantageous in that it enables the power consumption of the transponders to be decreased since the transponders only activate the LF listening means during limited periods.

According to another implementation mode of the method of the invention, it is provided that said identification signal and said activation signal are respectively transmitted at first and second different frequencies of the UHF band. For that purpose, HF transmission means 22, 23 are arranged with first and second listening channels corresponding respectively to first and second frequencies. Likewise, HF transmission means 40, 41 of transponder 16 are arranged to be able to transmit at one or the other of these frequencies. Owing to this characteristic, it is thus possible to differentiate the type of command as a function of the frequency of the received signal by device 12. This allows the determination of the type of the received command to be eliminated and in particular to provide a heading determining this type.

In a preferred variant of this last embodiment, only the first channel is selected during the LF transmission means activation periods of device 12. Thus, when these means are activated, device 12 no longer receives activation signals from its LF transmission means.

What is claimed is:

1. Method for keyless unlocking an access door to a closed space, in particular a motor vehicle, by means of an electronic system, comprising on the one hand a control device (12) for an electronic lock (14) for said door fitted with a first data management electronic unit (20) associated to first low frequency signal transmission means (24, 25) and to first high frequency signal reception means (22, 23) and on the other hand at least one portable transponder (16) comprising a second data management electronic unit (36) associated to second reception means (38, 39) for said low frequency signals and to second transmission means (40, 41) for said high frequency signals, said method comprising sending an interrogation signal to at least one transponder via said first transmission means and, in response, sending an identification signal via said at least one transponder to control said electronic lock, said first transmission means of said control device being activated by a signal sent by said second transmission means of said at least one transponder, characterized in that, in a preliminary operating mode of said system wherein said first transmission means are inactive, said second transmission means periodically transmits a high frequency signal for activating said first transmission means.

2. Method according to claim 1, characterised in that said activation signal is transmitted with a repetition period greater than 5 seconds.

3. Method according to claim 2, characterised in that said repetition period ranges substantially between 10 seconds and 1 minute.

4. Method according to any of the preceding claims, characterised in that said first transmission means are deactivated after a determined activation period if no valid identification signal is received, said preliminary mode being then selected again by said electronic system.

5. Method according to any of the preceding claims, characterised in that said transponder stops transmitting said activation signal as long as it receives low frequency signals from control device at least periodically, upon reception of an interrogation signal by said second reception means.

6. Method according to any of the preceding claims, characterised in that upon reception of said activation signal by said first reception means, an acknowledgement signal is transmitted at high frequency with third transmission means (32) of said control device, to indicate to said transponder having provided said activation signal that it was detected, said transponder comprising third reception means (48) for that purpose.

7. Method according to claim 6, characterised in that after reception of an acknowledgment signal, said transponder activates then said second reception means into a listening mode, said second means being deactivated at least most of the time during said preliminary mode of said electronic system.

8. Method according to any of the preceding claims, characterised in that said second transmission means send control signals whose heading indicates whether it is said identification signal or said activation signal.

9. Method according to any of claims 1 to 7, characterised in that said identification signal and said activation signal are respectively sent at first and second high frequencies different from each other, said first reception means having first and second listening channels corresponding respectively to these first and second frequencies.

10. Method according to claims 9, characterised in that only said first channel is selected during the periods when said first transmission means are activated.

* * * * *